United States Patent
Cash (10) Patent No.: US 6,450,800 B1
(45) Date of Patent: Sep. 17, 2002

(54) REGENERATIVE THERMAL OXIDIZER INCORPORATING A VENTURI STYLE BURNER

(75) Inventor: James T. Cash, Hackettstown, NJ (US)

(73) Assignee: Megtec Systems Inc., DePere, WI (US)

(*) Notice: Subject to any disclaimer, the term of this patent is extended or adjusted under 35 U.S.C. 154(b) by 0 days.

(21) Appl. No.: 09/543,713

(22) Filed: Apr. 5, 2000

(51) Int. Cl.⁷ .............. F23D 11/44; F23J 15/00; F27D 17/00
(52) U.S. Cl. .............. 431/11; 431/5; 431/75; 431/115; 431/178; 432/181; 110/212
(58) Field of Search .............. 431/11, 2, 3, 10, 431/350, 354, 286, 75, 174, 178, 5, 8, 115, 116, 170, 202; 432/180, 181, 182; 422/168, 169, 178; 126/112; 110/211, 212

(56) References Cited

U.S. PATENT DOCUMENTS

| | | | |
|---|---|---|---|
| 2,952,310 A | 9/1960 | Nuyl et al. | 158/117.5 |
| 4,267,152 A | 5/1981 | Benedick | 422/111 |
| 4,604,051 A | 8/1986 | Davies et al. | 431/166 |
| 5,297,954 A | 3/1994 | Colagiovanni | 431/5 |
| 5,376,340 A | * 12/1994 | Bayer et al. | 431/5 |
| 5,562,442 A | * 10/1996 | Wilhelm | 431/5 |
| 5,578,276 A | 11/1996 | Klobucar | 422/173 |
| 5,589,142 A | 12/1996 | Gribbon | 422/171 |

FOREIGN PATENT DOCUMENTS

GB 791222 2/1958

* cited by examiner

*Primary Examiner*—Henry Bennett
*Assistant Examiner*—Josiah C. Cocks
(74) *Attorney, Agent, or Firm*—Mitchell D. Bittman; Kevin S. Lemack (57) ABSTRACT

A burner that utilizes venturi action for induction of combustion air. The action of the venturi draws in surrounding air present around the nozzle to supply the necessary combustion air, provide forward moment to the burning gases to distribute their heat, and control the location of the heat release. The burner can thus be used to accomplish fuel gas injection directly into the combustion chamber of an oxidizer, and does not require a separate gas train or suffer from the other various drawbacks typical of conventional fuel gas injection systems. A stable flame is generated, and efficient heat-up accomplished. No extra combustion air is necessary.

9 Claims, 7 Drawing Sheets

REGENERATIVE THERMAL OXIDIZER INCORPORATING A VENTURI STYLE BURNER

BACKGROUND OF THE INVENTION

Regenerative thermal oxidizers are conventionally used for destroying volatile organic compounds (VOCs) emissions from industrial, manufacturing and power plants. Such oxidizers typically require high oxidation temperatures in order to achieve high VOC destruction and utilize high heat recovery efficiency. To more efficiently attain these characteristics, the "dirty" process gas which is to be treated is preheated before oxidation. A heat exchanger column or bed is typically provided to preheat these gases. The column is usually packed with a heat exchange material having good thermal and mechanical stability and high thermal mass. In operation, the process gas is fed through a previously heated heat exchanger column, which, in turn, heats the process gas to a temperature approaching or attaining its VOC oxidation temperature. This pre-heated process gas is then directed into a combustion chamber where any incomplete VOC oxidation is usually completed. The treated "clean" gas is then directed out of the combustion chamber and back through the heat exchanger column, or through a second heat exchange column. As the hot oxidized gas is fed through the second column, the gas transfers its heat to the heat exchange media in that column, cooling the gas and preheating the heat exchange media so that another batch of process gas may be preheated prior to the oxidation treatment. Usually, a regenerative thermal oxidizer has at least two heat exchanger columns which alternately receive process and treated gases. This process is continuously carried out, allowing even large volumes of process gas to be efficiently treated.

The performance of a regenerative oxidizer may be optimized by increasing VOC destruction efficiency and by reducing operating and capital costs. The art of increasing VOC destruction efficiency has been addressed in the literature using, for example, means such as improved oxidation systems and purge systems. Operating costs can be reduced by increasing the heat recovery efficiency, and by reducing the pressure drop across the oxidizer. Operating and capital costs may be reduced by properly designing the oxidizer and by selecting appropriate heat transfer packing materials.

A typical conventional regenerative thermal oxidizer includes a burner. The burner is used during start-up to bring the apparatus up to operating temperature. Once operating temperature is achieved, the burner output is lowered, and if sufficient VOC's are present in the process gas, the burner is preferably placed in pilot mode with the hope that the system will remain at the desired temperature due to the oxidation of the VOC's in the process gas. Any additional use of the burner during operation is not cost effective. Indeed, even in pilot mode, the burner is consuming fuel and is introducing ambient combustion air into the apparatus which must be heated to the operating temperature, thereby further reducing overall efficiency. Typically, nozzle mix burners require 25% of full flow combustion air during pilot operation.

In an effort to minimize use of the burner during operation of the oxidizer, it is known to apply auxiliary heat to a regenerative thermal oxidizer using fuel injection. Such auxiliary heat may be necessary, for example, when the concentration of VOC's in the process gas decreases at any given time, thereby not allowing the oxidizer to sustain the desired operating temperature due to the relatively low concentration of VOC's to oxidize. These systems typically employ the method of introducing gaseous fuel at or near the inlet point of the oxidizer. The injection location is typically just upstream or downstream of the inlet flow control valves or rotary distributor, as the case may be. The intent is to mix the fuel with the process gas prior to the gas stream flowing into the inlet heat exchange bed of the oxidizer. As the process gas flows through the inlet bed, it picks up the heat from the surrounding heat exchange media, and eventually passes the ignition temperature of the fuel. When the fuel-laden gas is heated sufficiently, the fuel oxidizes (burns), giving off heat to the process gas. The amount of fuel gas injected is controlled to maintain proper incineration temperature in the oxidizer. One example of such as system is described in U.S. Pat. No. 4,267,152. Temperature is sensed in the oxidizer combustion chamber, and when that temperature is at a predetermined level, fuel gas is supplied to the oxidizer combustion chamber by mixing it with the incoming effluent before application to the combustion chamber. Temperature uniformity in the combustion chamber and fuel cost savings are objectives of such a system.

In practice, however, it has been difficult to control the location in the heat exchange column where the injected fuel autoignites. Specifically, if one assumes that the desired oxidation temperature is 1600° F., the injected fuel gas ignites and creates that temperature in the heat exchange column at a location well upstream of the combustion chamber, perhaps at the midpoint of the bed. This results in the remaining portion of the heat exchange column through which the effluent flows becoming heat soaked and thus redundant, since no further heat exchange will take place in that portion of the bed. In addition, capital equipment costs are increased, as two gas trains are required, one to feed fuel to the burner in the combustion chamber and one for the injected fuel gas. Safety concerns, such as bed plugging and valve sticking, are also significant, and requirements to address these and other safety issues are costly. From an operational standpoint, the fuel gas injection must be stopped during each valve cycle to avoid dangerous gas build-up.

It is therefore an object of the present invention to provide a heat source such as for a regenerative thermal oxidizer which creates a stable flame and is efficient.

It is a further object of the present invention to provide a burner for a combustion chamber that does not introduce unnecessary ambient combustion air into the apparatus.

It is another object of the present invention to provide a burner which allows for the introduction of a fuel gas, via the burner, directly into the combustion zone of a regenerative thermal oxidizer.

It is yet another object of the present invention to provide a burner that self-regulates the amount of combustion air necessary to form and maintain a flame.

It is still another object of the present invention to provide a burner that does not require a combustion blower to supply combustion air to the burner for combustion of a fuel gas.

It is a further object of the present invention to eliminate the known potential safety hazards associated with injecting gas upstream of the combustion chamber.

It is a still further object of the invention to eliminate unburned fuel gas to be emitted during mode changes.

SUMMARY OF THE INVENTION

The problems of the prior art have been overcome by the present invention, which provides a burner that utilizes venturi action for induction of combustion air. In a preferred application, the burner of the present invention is used in a regenerative thermal oxidizer having one or more heat exchange beds associated with a combustion chamber or zone. The burner is preferably located in the combustion zone, such as at a location which is near or at the midpoint between the inlet and outlet heat exchange beds. The burner allows for the control of the location of the heat release.

In order to avoid the resulting high flame temperatures which would create high $NO_x$ formation and uneven heat distribution, fuel gas is injected directly into a burner designed to exhibit venturi action. The action of the venturi draws in surrounding (hot) process gas present around the nozzle to supply the necessary combustion air, provide forward moment to the burning gases to distribute their heat, and control the location of the heat release. The burner can thus be used to accomplish fuel gas injection directly into the combustion chamber of an oxidizer, and does not require a separate gas train or suffer from the other various drawbacks typical of conventional fuel gas injection systems. A stable flame is generated, and efficient heat-up accomplished. No extra combustion air is necessary.

DETAILED DESCRIPTION OF THE INVENTION

Figure 1:
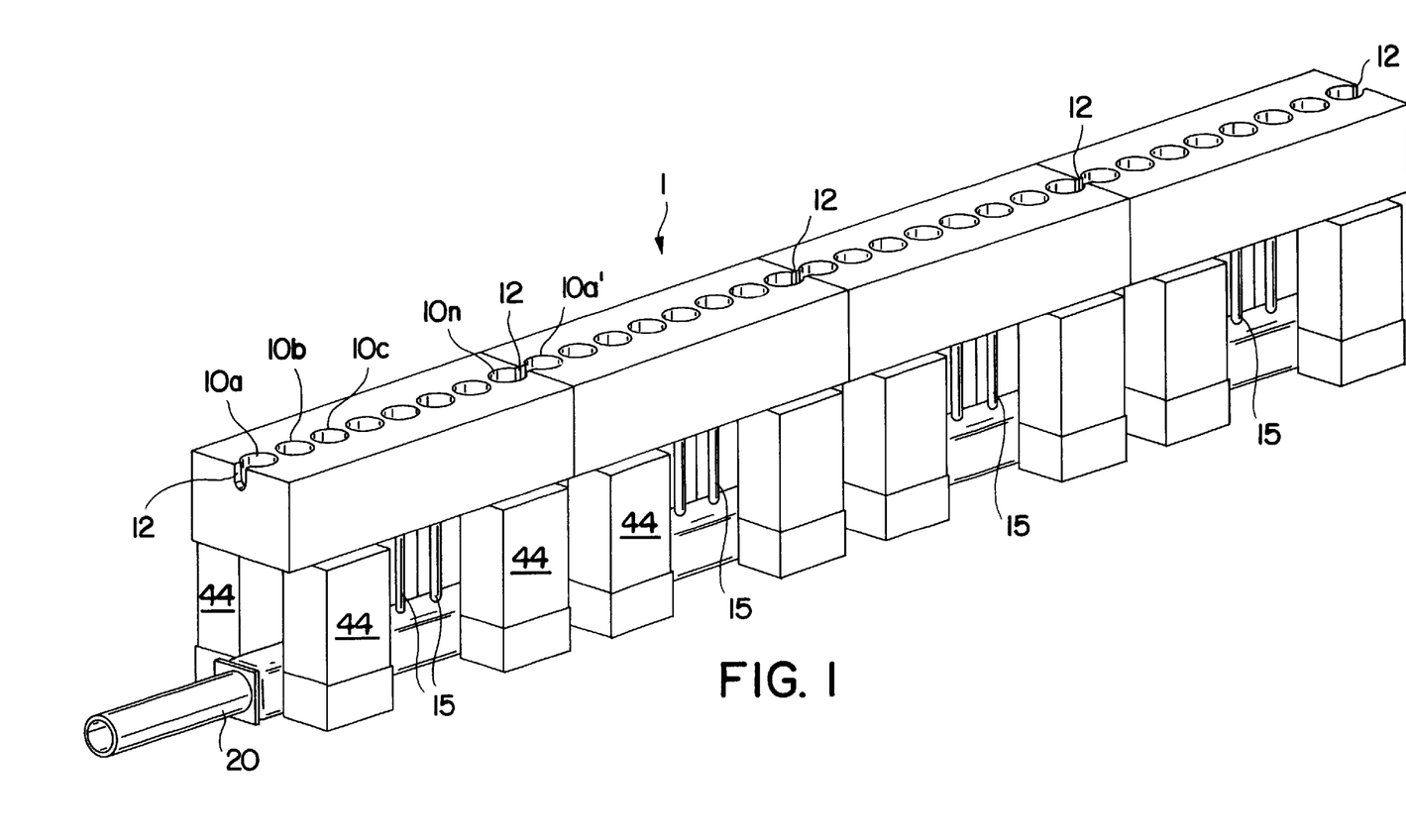
FIG. 1 is a perspective view of a burner in accordance with the present invention.
Figure 2:
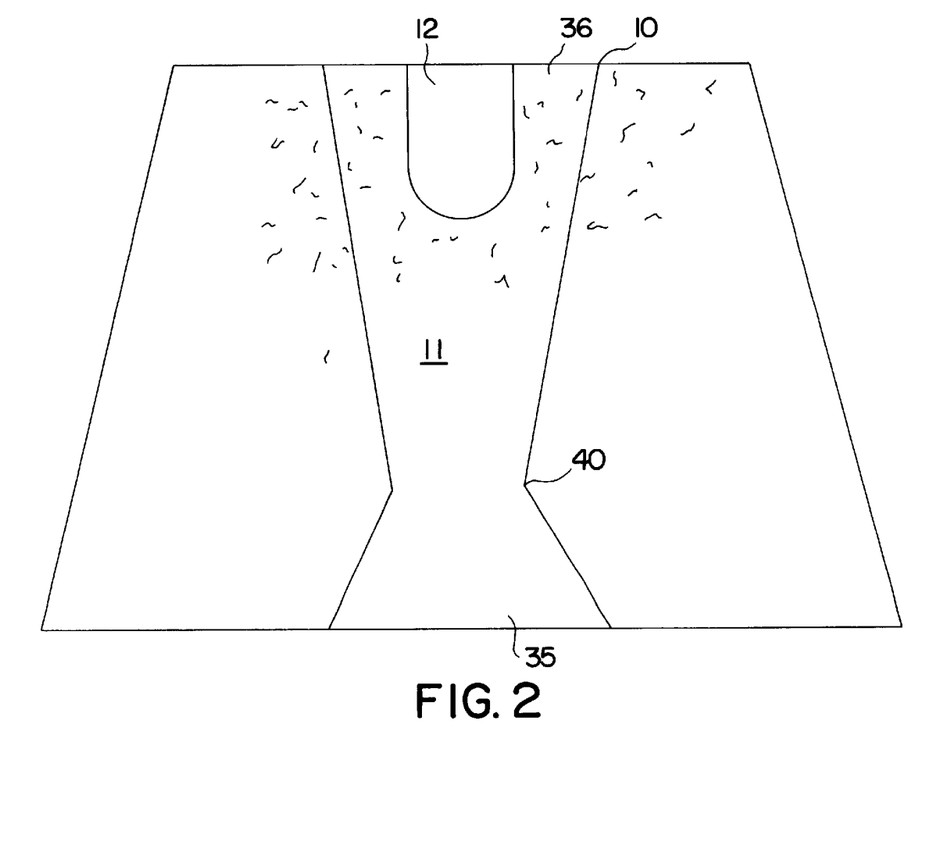
FIG. 2 is an end view of the burner in accordance with the present invention.
Figure 3:
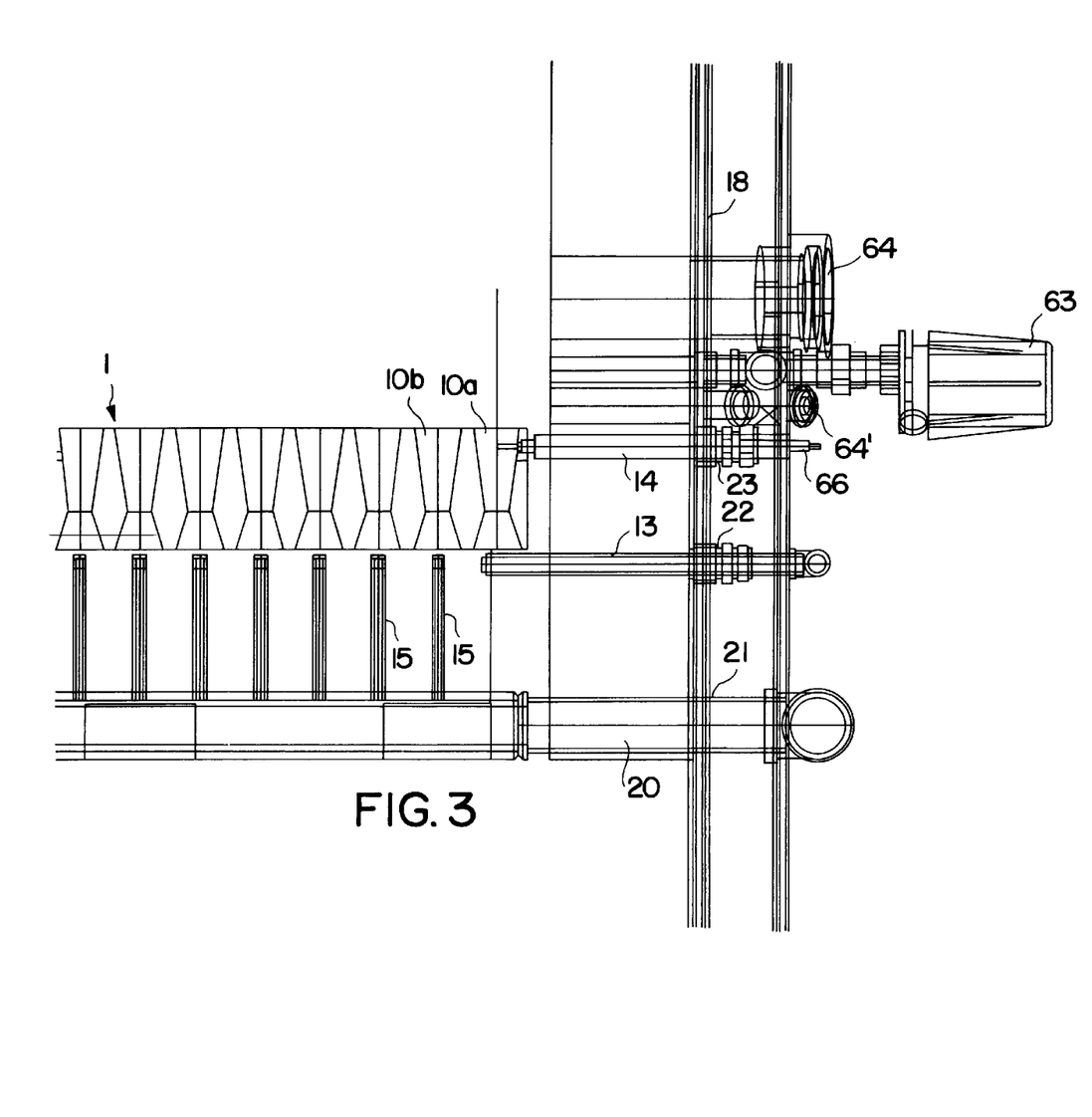
FIG. 3 is a cross-sectional view of the burner assembly in accordance with the present invention.

Turning first to FIGS. 1–3, there is shown a perspective view of a burner 1 in accordance with the present invention. A fuel gas supply line 20, which is typically supplied at ¼-15 psi, conveniently 5 psi at maximum feed, is shown feeding a plurality of spuds 15, each leading to a respective venturi nozzle 10. Suitable fuel gases are well known to those skilled in the art, and include natural gas (methane), propane, biogas or any gas with suitable BTU content for the intended purpose. Those skilled in the art will appreciate that although a plurality of venturi nozzles are shown, fewer or more could be used depending upon the application. Where a plurality of venturi nozzles are used, preferably the nozzles are arranged linearly as shown, although the particular arrangement is not critical, as other arrangements such as a grid pattern may be suitable depending upon the application. The first venturi nozzle 10a in the series preferably includes an ignitor passage 12 which accommodates an ignitor 14 (FIG. 3) to generate a flame. A pilot spud 13 also can be used at the first venturi nozzle 10a, as shown in FIG. 3. The fuel supply line 20, ignitor 14 and pilot spud 13 are secured using a mounting plate 18 and respective compression fittings 21, 22 and 23 as also shown in FIG. 3. The compression fittings for the ignitor 14 and spud 13 allow for radial adjustment of the ignitor and pilot spud so that they are appropriately located relative to the venturi nozzle 10a. Those skilled in the art will be able to determine the optimal location based upon performance. Flame supervision with a UV scanner 63 ensures that a flame is present to satisfy safety regulations. Sight ports 64, 64' also can be mounted to the plate 18 as shown, and provide visual confirmation of the flames for the burner and the pilot. A spark plug 66 is also shown.

Suitable materials of construction for the venturi nozzle 10 are those capable of withstanding high temperatures, including temperatures exceeding 1600–1800° F., such as refractory materials, especially ceramic tile. Since the spud nozzle emitting the fuel gas to the venturi nozzle 10 of the burner remains relatively cool, it can be constructed of stainless steel (above the insulation), preferably 310 or similar stainless steel. Although burner 1 is shown in FIG. 2 as having a trapezoidal cross-section, other shapes, such as square or rectangular (FIG. 1), can be used and generally depend on ease of manufacture rather than operational efficiencies.

The venturi action of the burner 1 of the present invention must be sufficient to draw combustion air into the nozzle 10 which mixes with the fuel gas from a fuel supply source. The combustion air is preferably simply the air surrounding the burner. The present inventor has found that suitable venturi action is created even if the gas passageway 11 (FIG. 2) defined by nozzle 10 has a constant cross-section, due to the velocity of the fuel introduced into the nozzle 10. Accordingly, suitable ratios of the inlet or outlet diameters of the venturi nozzle 10 to the throat 40 diameter are 1:1 to 100:1, with 2:1 being preferred. The more restrictive the throat 40, the less induction of combustion air occurs. Similarly, as the inlet or outlet diameter to throat ratio approaches 1:1 (i.e., the throat widens), more combustion air is forced into the passageway 11. In the preferred embodiment, each venturi nozzle 10 is defined by a passageway 11 that has an opening of circular cross-section of 2 inches in diameter, both at the inlet 35 and outlet 36 (FIG. 2). The burner tile is 5 inches high, with the throat 40 converging to 1 inch in diameter 1.5 inches from the inlet 35. Such a design results in excellent venturi action as the fuel gas travels through the passageway 11.

Figure 8:
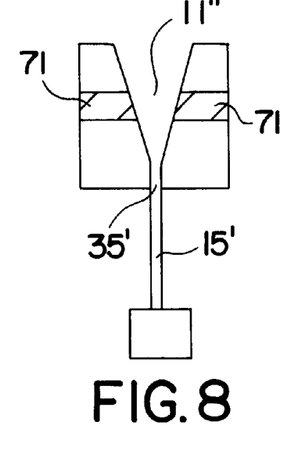
FIG. 8 is a cross-sectional view of yet another alternative embodiment of the burner in accordance with the present invention.

Alternatively, separate combustion air passageway(s) can be provided in the periphery of the burner as shown in FIG. 8.

The walls of the burner 1 which define the passageway 11 create a boundary around the spud 15 and serve to mix the fuel gas and the combustion air. The height of the burner walls holds onto the flame that is created upon ignition. Preferably each spud is positioned flush with the inlet 35 of the passageway 11 to ensure that the fuel gas enters the passageway 11.

Where the burner is comprised of a plurality of nozzles 10, preferably the nozzles 10 are placed in close enough proximity to each other that the flame initiated in the first nozzle 10a can pass to the second nozzle 10b, which in turn can pass to the third nozzle 10c, etc. This eliminates the requirement for individual ignitors for each respective nozzle 10. A suitable distance between outer edges of the venturi nozzle outlets 36 is 0.5 inches or less. Alternatively, multiple ignitors could be used.

The burner 1 can be used in modular form, wherein one or more venturi nozzles 10 are formed in each module, and the modules are linearly arranged in side-by-side relation, for example, as shown in FIG. 1. It is advantageous to include the ignitor passageway 12 in both the first venturi nozzle 10a and the last venturi nozzle 10n so that the orientation of each module is reversible. In addition, the passageway 12 assists in carrying the flame from the nozzle 10n to the nozzle 10a' of an adjacent module.

Figure 6:
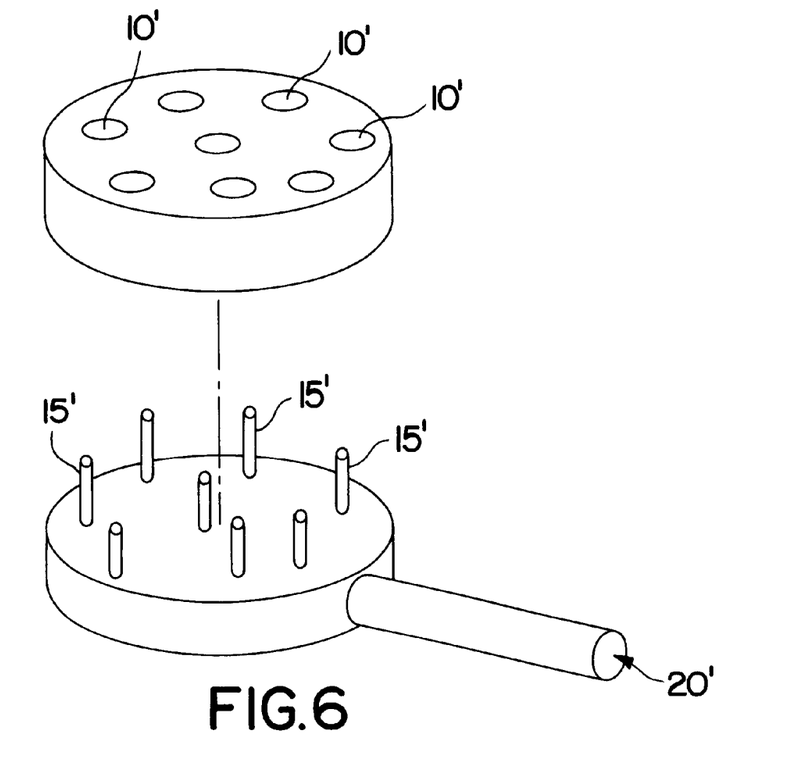
FIG. 6 is a perspective view of an alternative embodiment of the burner in accordance with the present invention.

The arrangement of the modules is not limited to a linear configuration; any pattern, symmetrical or asymmetrical, could be used, and may depend upon the application. For example, FIG. 6 shows a clustered burner wherein the venturi nozzles 10' are circularly arranged, each being fed by an independent spud 15 as before. A fuel gas supply line 20' feeds fuel gas to a plurality of spuds 15', each of which feeds a respective venturi passageway.

Figure 7:
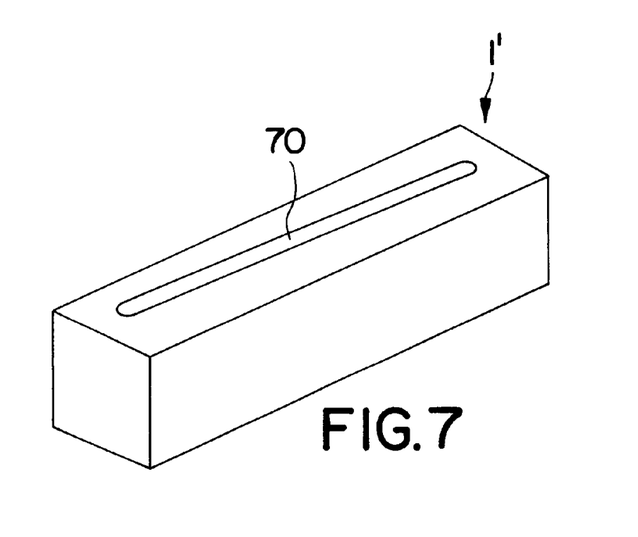
FIG. 7 is a perspective view of another alternative embodiment of the burner in accordance with the present invention.
Figure 7A:
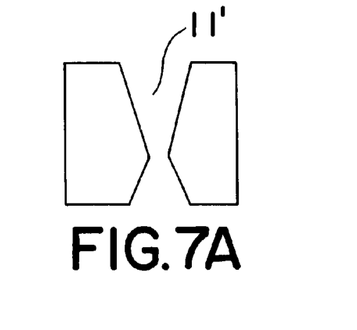
FIG. 7A is a cross-sectional view of the burner of FIG. 7.

Another embodiment of the burner of the present invention is shown in FIGS. 7 and 7A. The outlet in this embodiment is a slot 70, although the cross-section of the passageway 11' is the same as that shown in FIG. 2 so as to create venturi action. Again, the velocity of the gas entering the passageway 11' must be sufficient to create enough suction to draw sufficient combustion air into the passageway to create a flame. With the slotted design, a series of single point spuds feeding the gas into the burner is not necessary; a single feed can be used. A plurality of slotted burners can be used in a modular configuration as well.

Figure 8A:
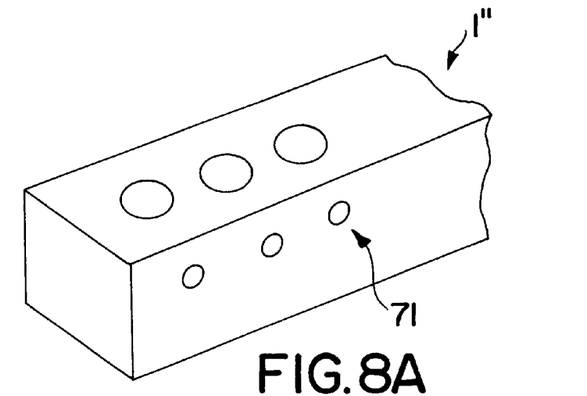
FIG. 8A is a perspective view of the burner of FIG. 8.
Figure 8B:
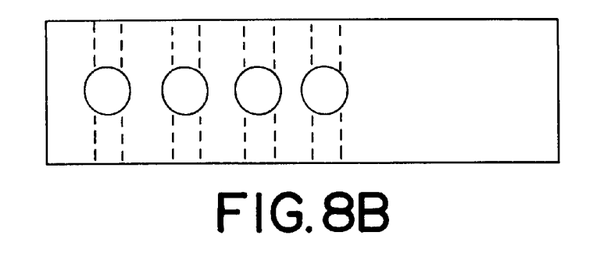
FIG. 8B is a top view of the burner of FIG. 8.

FIGS. 8, 8A and 8B illustrate an embodiment where passageways are created in the burner body for entry of combustion air. In this embodiment, the spud 15' optionally may be inserted directly into the inlet 35' as shown, since alternative inlets for combustion air are provided. The velocity of the gas flowing through the passageway 11" creates a negative pressure in the passageway 11", pulling surrounding air into the combustion air inlets 71 and then into the passageway 11". There can be one or more combustion air inlets 71, and their particular location is not critical, as long as there is sufficient residence time in the passageway 11" such that intimate mixing of the combustion air and the fuel gas can take place.

Figure 9:
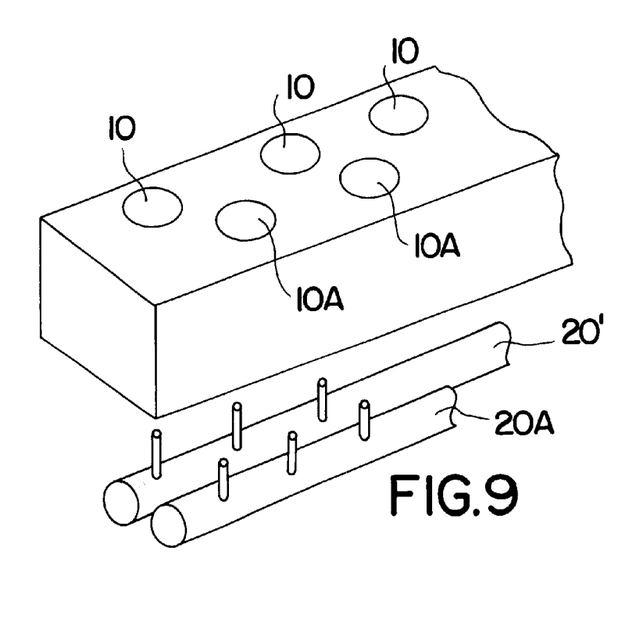
FIG. 9 is a perspective view of still another alternative embodiment of the burner in accordance with the present invention.

FIG. 9 illustrates a multi-fuel burner wherein one gas supply line 20' feeds a fuel gas to one or more burner nozzles 10, and a second gas supply line 20A feeds a secondary gas to one or more different nozzles 10A. The identity of the secondary gas is not critical; for example, it can be the same as or different from the fuel gas supplied through line 20', or it can be a waste gas. Since the fuel gas from gas supply line 20' sustains the flame, the secondary gas can be a less efficient gas. If excess heat is generated in the burner, it can be removed and used for auxiliary purposes.

The burner of the present invention is particularly advantageous when used with regenerative thermal oxidation apparatus. Heat transfer zones in the regenerative oxidizer must be periodically regenerated to allow the heat transfer media (generally a bed of ceramic stoneware or structured packing) in the depleted energy zone to become replenished. This is accomplished by periodically alternating the heat transfer zone through which the cold and hot fluids pass. Specifically, when the hot fluid passes through the heat transfer matrix, heat is transferred from the fluid to the matrix, thereby cooling the fluid and heating the matrix. Conversely, when the cold fluid passes through the heated matrix, heat is transferred from the matrix to the fluid, resulting in cooling of the matrix and heating of the fluid. Consequently, the matrix acts as a thermal store, alternately accepting heat form the hot fluid, storing that heat, and then releasing it to the cold fluid. The alternating of the heat transfer zones to provide matrix regeneration is accomplished via regenerative thermal oxidizer switching valves. While the switching valves provide the means for matrix regeneration, the act of regeneration in itself results in a short duration emission of untreated fluid direct to atmosphere, causing a lowering of the volatile organic compound (VOC) destruction efficiency, and in cases involving high boiling point VOC's, potential opacity issues. To improve the VOC destruction efficiency and eliminate opacity issues resulting from matrix regeneration, the untreated fluid can be diverted away from the oxidizer stack and directed into a "holding vessel" or VOC entrapment chamber. The function of the entrapment chamber is to contain the slug of untreated fluid which occurs during the matrix regeneration process long enough so that the majority of it can be slowly recycled (i.e., at a very low flow rate) back to the inlet of the oxidizer for treatment. The untreated fluid in the entrapment chamber must be entirely evacuated and recycled back to the oxidizer inlet within the time frame allotted between matrix regeneration cycles since the process must repeat itself for all subsequent matrix regenerations. Gas injection directly in the combustion zone eliminates the current problem of stopping gas injection prior to valve changes or suffering from natural gas emission.

Figure 4:
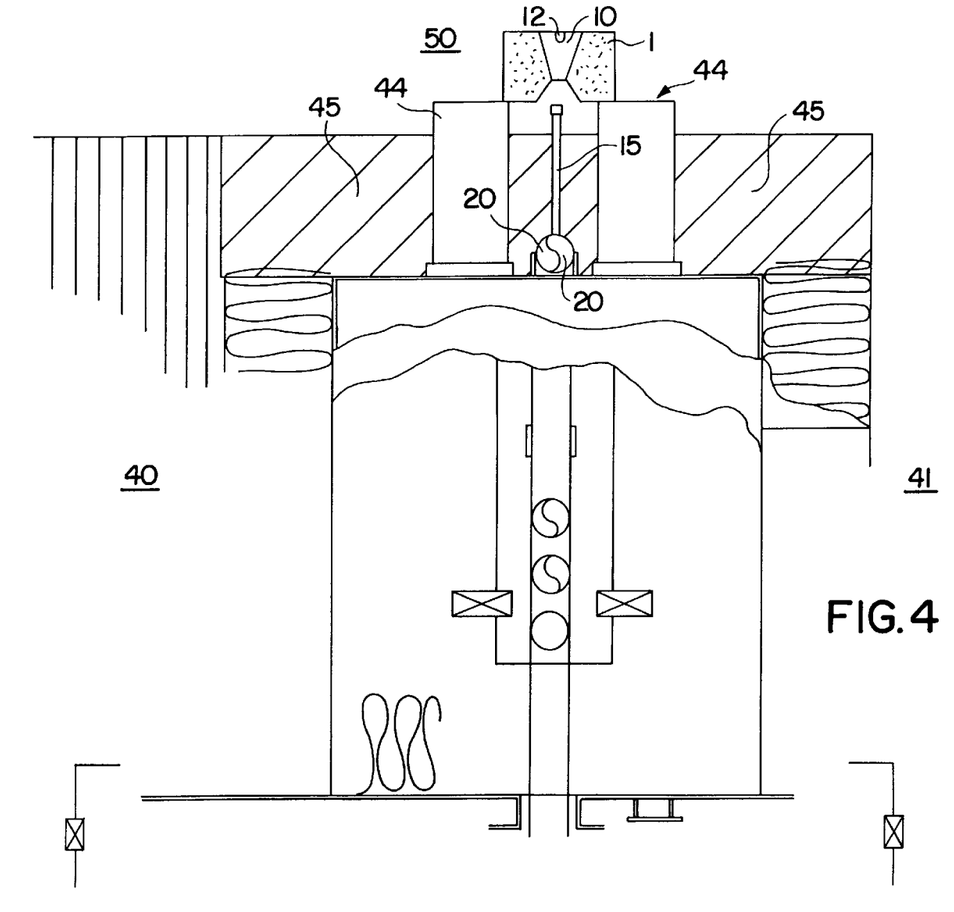
FIGS. 4 and 5 are cross-sectional end views of the burner mounted in a regenerative thermal oxidizer in accordance with a preferred embodiment of the present invention.
Figure 5:
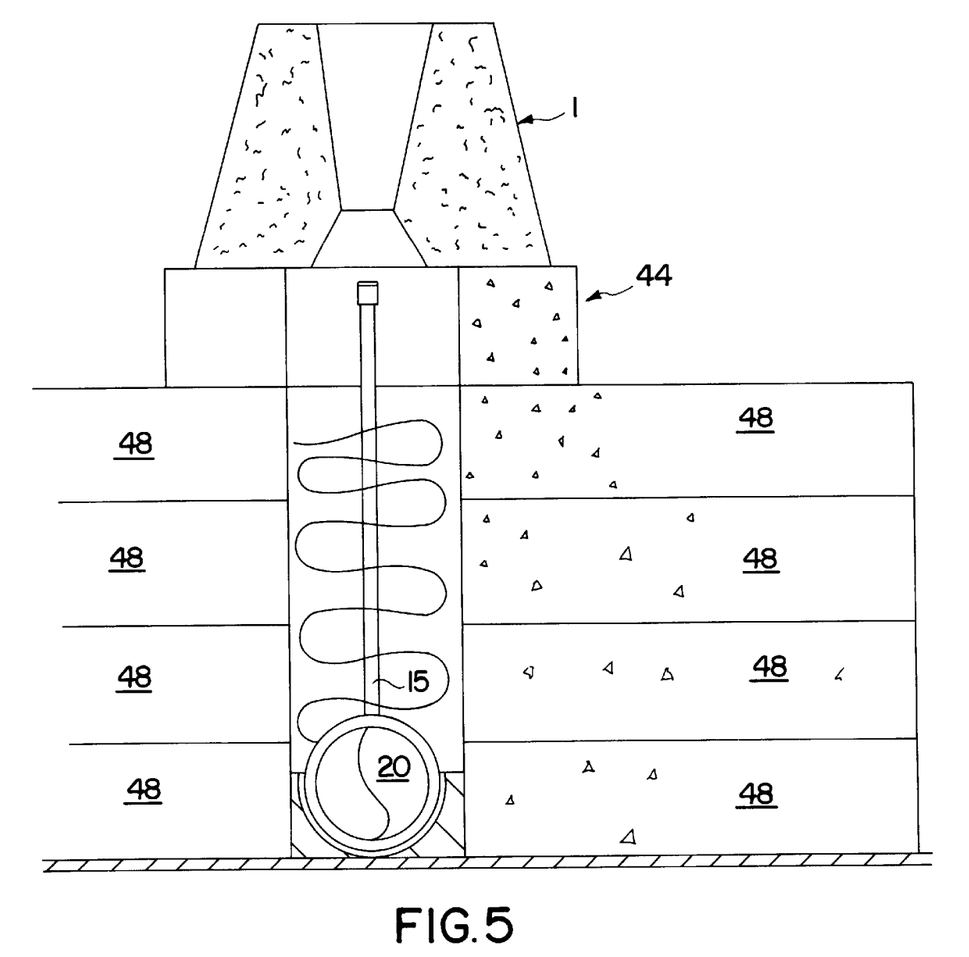

The particular location of the burner of the present invention in the combustion zone of a regenerative oxidizer is not particularly limited. For two-column oxidizers, the burner is preferably positioned in the space between the two columns as shown in FIG. 4. Thus, a first bed 40 containing heat exchange media is in fluid communication with combustion chamber 50, as is a second bed 41 also containing heat exchange media. The burner 1 is positioned between the two columns 40, 41, and supported on refractory material such as brick support blocks 44. The weight of the burner 1 itself is often sufficient to stabilize the burner, although suitable means can be used to mount the burner 1 if desired. The supports 44 are themselves supported on insulating material 48 which also may be made of refractory material such as brick, as shown in FIG. 5. Soft insulation 45 surrounds the support structure. The gap between the brick supports 44 accommodates the spuds 15 and gas supply 20 as shown.

Operable air to gas ratios for the burner 1 are from about 1:3 to about 1:100, depending upon the application and desired flame quality and fuel gas burning efficiency. More air results in a cooler blue flame, whereas more fuel results in a hotter yellow flame but can generate higher concentrations of $NO_x$. At typical operating oxidizer temperatures of 1600° F., a stable flame can be achieved with less combustion air. Indeed, at these temperatures, even if the flow of fuel gas through the passageway 40 of the burner 1 is so low that minimal or no venturi action takes, place, the gas will still burn. During start-up, the preferred ratio is 10:1.

When placed in the combustion chamber of an oxidizer, the burner utilizes combustion chamber air as combustion air. Since the combustion chamber air is at or near the desired temperature (1500–1600° F.), energy is not necessary to heat the combustion air to the operating temperature as was the case with conventional burners. Moreover, during switching, the injection of fuel gas in conventional systems had to be interrupted. Since the injection of fuel gas is accomplished in the present invention via the burner, no such interruption is necessary.

Temperature is sensed or detected by suitable means such as a thermocouple, and is continuously sampled by a programmable logic controller (PLC). A PLC is a device with computing and logic capabilities that among other things is able to sense the input signals of multiple process variables and generate output signals responsive to the input signals as programmed. The location of the temperature sensor(s) is not particularly limited, and is preferably located in the combustion chamber or in the heat exchange beds. When the concentration of contaminants in the contaminated gas being processed falls below a certain level, the sensed temperature will also fall below a certain level, and in response thereto, the combustible fuel gas can be added directly into the combustion zone through the venturi burner of the present invention. Thus, the point of heat release of the fuel gas is known, and is in the ideal location for efficient use of that heat.

In operation, once the combustion chamber and associated heat exchanger matrix of each of the two energy recovery columns are heated up to the required temperature such as by the venturi burner generating a flame in the combustion chamber, the untreated process exhaust is directed into the oxidizer for treatment. The cooler untreated process exhaust passes first through one of the heat recovery columns and in so doing, is preheated via convective heat transfer with the hotter matrix heat exchanger. It is this preheating or energy transfer which provides the high degree of thermal efficiency associated with regenerative thermal recovery. Upon exiting the matrix wherein a major portion of the oxidation has already been initiated, the process fluid enters the combustion chamber where oxidation of any untreated fluid is completed. Upon exiting the combustion chamber, the treated fluid now passes through the second heat recovery column where the hotter fluid now transfers heat back to the cooler matrix.

Periodically, the untreated process exhaust must alternative heat recovery columns in order to maintain the thermal efficiency via regeneration of the respective heat exchanger matrix. During heat exchanger matrix regeneration, untreated flow (1) residing within the matrix void volume of the matrix which has just changed from the ingoing matrix preheating the process gas to the outgoing matrix now under going regeneration; (2) residing in the switching valve to matrix connecting duct of the outgoing matrix under regeneration; (3) residing in the oxidizer switching valve inlet manifold; and (4) passing through the switching valve(s) during the valve switching cycle, is directed into an optional entrapment chamber in order to minimize its escape to atmosphere. In order to be able to pull the untreated flow out of the entrapment chamber to be recycled to the oxidizer, the entrapment chamber must be under atmospheric pressure, and is thus in communication with an exhaust stack leading to atmosphere. The suction side of a forced draft fan creates a suction pressure at its inlet, which not only helps to transport the untreated process flow from its source to the oxidizer, but also is used to overcome the exhaust stack draft and evacuate the untreated flow from the entrapment chamber and return it to the oxidizer fan inlet.

After start-up, the burner 1 of the present invention can function to inject fuel gas into the combustion chamber in order to compensate for low VOC concentration in the gas being processed. For example, temperature can be sensed in the oxidizer, and if it falls below a predetermined level, fuel gas can be introduced through the burner 1 directly into the combustion chamber. The fuel gas autoignites at the temperatures (1500–1600° F.) present in the combustion chamber, and thus supplies auxiliary heat to the process to supplement for the low VOC's present in the process gas.

The addition of air, oxygen, nitrogen or other gases can be introduced into the gas train prior to injection for the purpose of pre-mixing or cooling. This can be useful for cooling nozzles at low or no gas flow, producing a cooler low NO, flame, and allowing complete combustion in a low oxygen atmosphere.

The orientation of the burner 10 in the apparatus in which it is used is not limited. Since the velocity of the fuel gas being injected into the burner results in venturi action that draws in the appropriate amount of combustion air, the burner can be operated at virtually any angle, including up-side-down, where the flame is directed 180° away from gravity.

Applications in catalytic oxidizers are also contemplated.

What is claimed is:

1. A regenerative thermal oxidizer for oxidation of volatile components in a process gas, comprising:

a first regenerative bed having a first inlet and a first outlet, said bed comprising heat exchange media and being in communication with a combustion zone;

a second regenerative bed having a second inlet and a second outlet, said bed comprising heat exchange media and being in communication with said combustion zone;

valve means for alternately directing said process gas into one or the other of said first and second heat exchanger columns;

a burner associated with said combustion zone for providing heat in said zone, said burner comprising a passageway having an inlet and an outlet spaced from said inlet; and fuel gas supply means for supplying fuel to said burner; whereby the supply of fuel gas to said burner causes process gas in said combustion zone to enter said burner passageway and mix with said fuel gas.

2. The regenerative thermal oxidizer of claim 1, wherein said passageway comprises a venturi.

3. The regenerative thermal oxidizer of claim 1, wherein said passageway has a cross-section that narrows with respect to the cross-section of said inlet.

4. A regenerative oxidizer for purifying a gas, comprising:

at least first and second regenerator columns, each of said columns comprising heat exchange media;

gas inlet means and gas outlet means in communication with each of said regenerator columns;

a combustion zone in communication with each of said regenerator columns;

valve means for alternately directing said gas into the inlet means of one of said columns in a first direction and through another of said columns in a second direction;

temperature sensing means for continuously detecting temperature of said gas in said oxidizer;

a burner associated with said combustion zone for providing heat in said zone, said burner comprising a passageway having an inlet and an outlet spaced from said inlet; and fuel gas supply means for supplying fuel to said burner, whereby the supply of fuel gas to said burner causes process gas in said combustion zone to enter said burner passageway and mix with said fuel gas.

5. The regenerative oxidizer of claim 4, wherein said fuel gas is supplied to said burner in response to said temperature sensing means.

6. The regenerative oxidizer of claim 4, wherein said temperature sensing means is in said combustion zone.

7. A process for combusting gas, comprising:

providing an oxidizer having:

at least first and second regenerator columns, each comprising heat exchange media and having gas inlet means and gas outlet means; a combustion zone in communication with each of said regenerator columns; a burner in said combustion zone for generating heat; and valve means for alternately directing said gas into the inlet means of one of said columns in a first direction and through another of said columns in a second direction;

detecting the temperature of said gas in said oxidizer; and adding fuel into said combustion zone through said burner when said detected temperature achieves a predetermined level.

8. The process of claim 7, wherein said temperature is detected in said combustion zone.

9. The process of claim 7, wherein said burner has a housing defining at least one passageway having an inlet and an outlet spaced from said inlet; and wherein said added fuel is introduced to said inlet of said at least one passageway at a predetermined velocity which causes combustion air in said combustion zone to flow into said passageway and mix with said fuel.

* * * * *